June 10, 1930.  R. S. BASSETT  1,762,949

LIQUID METER

Filed Oct. 11, 1927

WITNESSES
Chas. F. Bassett
Helen Holland

INVENTOR
Robt S. Bassett

Patented June 10, 1930

1,762,949

UNITED STATES PATENT OFFICE

ROBERT S. BASSETT, OF BUFFALO, NEW YORK

LIQUID METER

Application filed October 11, 1927. Serial No. 225,492.

The general object of the invention is to provide a liquid meter or measuring device which can be manufactured easily and at a low cost, and which at the same time will have great durability.

Figure 1:
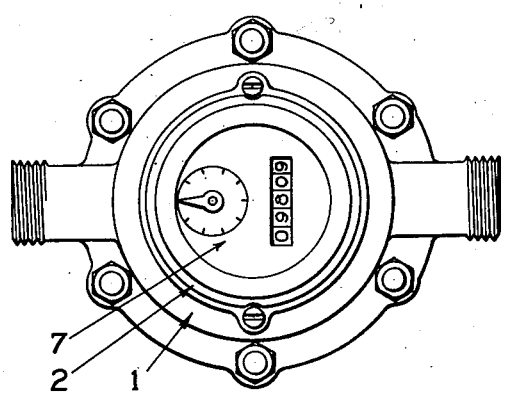

In the accompanying drawings Figure 1 is a top view of the exterior of the meter and shows the inlet and outlet openings, and the indicating dial of the meter register.

Figure 2:
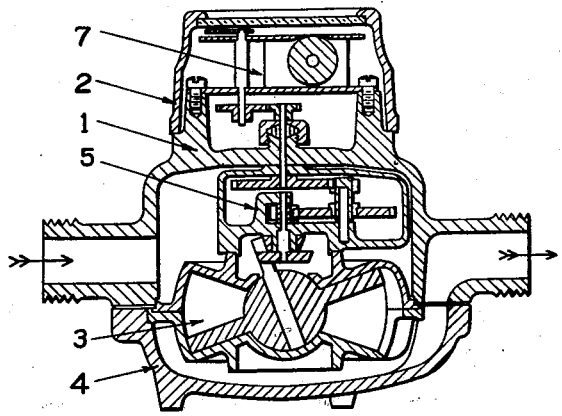

Figure 2 is the vertical section through the meter and shows the arrangement of the internal parts. In this view, 1 is the top casing on which is mounted register box 2. Measuring device 3 is shown in the form of a disc chamber containing a nutating disc which is clamped between top casing 1 and bottom casing 4. 5 is the connecting mechanism, an intermediate gear train transmitting the motion of measuring mechanism 3 to the indicating mechanism 7, encased in register box 2.

The general construction of the meter as shown is well known to the trade and I will not explain in detail the operation of the meter. The exact construction of the meter casing, the measuring device, the indicating register and the intermediate gear train connecting them are not limited to the exact construction shown, but may be of any other suitable construction performing the same work and obtaining similar results.

Liquid meters are used on liquids of all kinds, but most of them are used for measuring the flow of water. The measuring mechanism and the intermediate gear train which are submerged in the liquid are usually made of a copper composition containing other metals such as lead, tin, zinc, nickel, etc. The resulting composition will resist the corrosive action of the liquids to be measured fairly well, but at the same time will be such that it can be readily cast, punched or machined as required in the manufacturing processes to make these internal working parts in their completed form. These parts could be made of other materials which might have greater wearing qualities, and which might be more resistant to corrosion, but such materials, as have been available, have been very difficult to handle in quantity manufacturing processes, and have not proven successful for general adoption.

As the measuring mechanism and the intermediate gear train are subject to wear, due to the parts moving against each other, the wearing surfaces should be as hard as possible, and at the same time of such a material that the liquids to be measured will not cause them to corrode. In the past it has been customary to coat these internal parts with tin, to reduce friction and to resist corrosion. Tin is much softer, however, than the copper composition of which the parts are usually made, and by coating them with tin, they do not wear appreciably longer than if they were not coated. Nickel has also been used to some extent for coating these parts, but has not been a success.

My invention covers making the volume measuring mechanism and the connecting mechanism between the volume measuring mechanism and the indicating mechanism in such a manner as to resist wear most effectively. Chromium and other similar hard metals are very hard to fabricate and I have, therefore, invented a manner of construction by which parts of chromium and other similar hard metals can be successfully manufactured and used. This method of construction is to provide an inner core member which will act as a reinforcement for the part in question and which will give it strength and ability to resist shock. The parts, themselves with the exception of the tough core members, are made of chromium or similar hard metals and it is novel to construct in a liquid meter these parts so that they will resist wear to a very great extent. By having the inner reinforcing core member to give strength and shock-resisting qualities, an outer shell member of chromium can be used and because of the reinforcing effect of the inner member, this outer member can be made of those proportions which are required to resist wear without regard to provision for having to resist shock and strain. The use of such composite parts in a liquid meter is novel and in actual commercial use has proved highly successful.

Having thus described the invention what

I claim as new and desire to secure by Letters Patent is:

1. In a liquid meter, an indicating mechanism and a volume measuring mechanism together with connecting means; said volume measuring mechanism comprising a measuring chamber having an inner core member made of a metallic alloy containing copper to give strength and toughness and an outer shell member made of chromium to resist wear, substantially as and for the purpose described.

2. In a liquid meter, an indicating mechanism and a volume measuring mechanism together with connecting means; said volume measuring mechanism comprising a measuring chamber having an inner core member made of a metallic alloy having strength and toughness and an outer shell member made of a metallic material containing chromium to resist wear, substantially as and for the purpose described.

3. In a liquid meter, an indicating mechanism and a volume measuring mechanism together with a connecting mechanism; said connecting mechanism comprising gears having an inner core member made of a tough strong metallic composition, and an outer shell member made of a metallic material containing chromium to resist wear, substantially as and for the purpose described.

4. In a liquid meter, an indicating mechanism and a volume measuring mechanism together with a connecting mechanism; said connecting mechanism comprising gears having an inner core member made of a metallic alloy containing copper to give strength and toughness, and an outer shell member made of a hard, wear-resisting metallic material containing chromium, substantially as and for the purpose described.

5. In a liquid meter, an indicating mechanism, a volume mesuring mechanism and a connecting mechanism, including wear exposed gears having an outer shell member made of a hard wear-resisting metallic material containing chromium, and an inner core member made of material that is substantially softer than said outer shell member, substantially as and for the purpose described.

ROBT. S. BASSETT.